United States Patent
Chun et al.

(10) Patent No.: US 9,671,884 B2
(45) Date of Patent: Jun. 6, 2017

(54) APPARATUS AND METHOD FOR OPERATING MULTIMEDIA APPARATUS PERFORMING WIRELESS CHARGING FOR PORTABLE APPARATUS

(71) Applicant: Hyundai Motor Company, Seoul (KR)

(72) Inventors: Chang Woo Chun, Gyeonggi-do (KR); Sung Hwan Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 255 days.

(21) Appl. No.: 14/288,880

(22) Filed: May 28, 2014

(65) Prior Publication Data
US 2015/0177896 A1   Jun. 25, 2015

(30) Foreign Application Priority Data
Dec. 20, 2013  (KR) .................. 10-2013-0160578

(51) Int. Cl.
| G06F 3/044 | (2006.01) |
| G06F 3/041 | (2006.01) |
| B60K 37/00 | (2006.01) |
| G06F 3/0354 | (2013.01) |

(52) U.S. Cl.
CPC ............ G06F 3/0412 (2013.01); B60K 37/00 (2013.01); G06F 3/03547 (2013.01); G06F 3/044 (2013.01)

(58) Field of Classification Search
CPC .............................. G06F 3/0412; G06F 3/044
See application file for complete search history.

(56) References Cited

U.S. PATENT DOCUMENTS

| 7,817,035 B2* | 10/2010 | Hardacker ............. G08B 21/24 340/539.1 |
| 8,610,834 B2* | 12/2013 | Hardacker ............. H04B 1/202 340/538.15 |
| 2002/0118131 A1* | 8/2002 | Yates .................. G06F 3/03547 341/176 |
| 2005/0046751 A1* | 3/2005 | Simmons ............... G08B 21/24 348/734 |
| 2011/0074344 A1 | 3/2011 | Park et al. |
| 2011/0216236 A1* | 9/2011 | Kasahara ............. H04N 5/2256 348/370 |

(Continued)

FOREIGN PATENT DOCUMENTS

| KR | 10-2006-0130797 | 12/2006 |
| KR | 10-2011-0034773 | 4/2011 |

(Continued)

*Primary Examiner* — Amare Mengistu
*Assistant Examiner* — Kelly B Hegarty
(74) *Attorney, Agent, or Firm* — Mintz Levin Cohn Ferris Glovsky and Popeo, P.C.; Peter F. Corless

(57) ABSTRACT

An apparatus and a method for operating a multimedia apparatus and performing wireless charging of a portable apparatus are provided. The apparatus includes: a communicator configured to perform a communication with a multimedia apparatus; a touch pad configured to generate an input signal according to an input generated from an external source; and a controller configured to verify an input position generated in the touch pad so that a point is displayed on a position of the multimedia apparatus that is identical to the position where the input is generated, and provide the verified input position to the multimedia apparatus.

14 Claims, 10 Drawing Sheets

(56) References Cited

U.S. PATENT DOCUMENTS

| | | | |
|---|---|---|---|
| 2012/0040720 A1* | 2/2012 | Zhang | H04M 1/7253 455/557 |
| 2012/0054401 A1* | 3/2012 | Cheng | G06F 1/1632 710/304 |
| 2013/0175986 A1 | 7/2013 | Senatori | |
| 2015/0234427 A1* | 8/2015 | Schmidt | G06F 1/1632 361/679.43 |

FOREIGN PATENT DOCUMENTS

| | | |
|---|---|---|
| KR | 10-2011-0055903 A | 5/2011 |
| KR | 10-2012-0023839 | 3/2012 |
| KR | 10-1221427 | 1/2013 |
| KR | 10-2014-0100381 A | 8/2014 |

* cited by examiner

APPARATUS AND METHOD FOR OPERATING MULTIMEDIA APPARATUS PERFORMING WIRELESS CHARGING FOR PORTABLE APPARATUS

CROSS-REFERENCE TO RELATED APPLICATION

This application claims the benefit of priority to Korean Patent Application No. 10-2013-0160578, filed on Dec. 20, 2013 in the Korean Intellectual Property Office, the invention of which is incorporated herein in its entirety by reference.

BACKGROUND OF THE INVENTION

Field of the Invention

The present invention relates to an apparatus and method for operating a multimedia apparatus performing a wireless charging of a portable apparatus, and more particularly, to an apparatus and a method for operating a multimedia apparatus performing a wireless charging of a portable apparatus that may operate a multimedia apparatus equipped inside a vehicle.

Description of the Related Art

As a vehicle is widely used in general, the various apparatus providing a variety of conveniences to the drivers are developed. The typical apparatus includes a navigation device to help for a vehicle operation. The navigation device provides a route guidance service guiding a movement route to a destination, however, recently, the navigation device has been evolved into a multimedia apparatus by providing various functions such as a music play function, a web browsing function, and a DMB broadcasting reception function, etc. besides the route guidance service.

In order to control such multimedia apparatus more efficiently, or to easily transmit a data to the multimedia apparatus, a technology controlling the multimedia apparatus by using a smart phone has been developed continuously.

In addition, due to its large amount of battery consumption in the smart phone, it might be cumbersome for the drivers who use such a smart phone to charge it in wired by connecting a charger to a vehicle.

SUMMARY OF THE INVENTION

Accordingly, the present invention is designed to address at least the above-mentioned problems and/or disadvantages and to provide at least the advantages described below.

The present invention has been made in view of the above problems, and provides an apparatus and a method for operating a multimedia apparatus performing a wireless charging of a portable apparatus that may control the multimedia apparatus equipped in a vehicle by locating inside of the vehicle.

The present invention further provides an apparatus and a method for controlling a multimedia apparatus performing a wireless charging of a portable apparatus that may wirelessly charge a portable apparatus mounted on an operating apparatus that may control the multimedia apparatus.

The present invention further provides an apparatus and a method for operating a multimedia apparatus performing a wireless charging of a portable apparatus that may wirelessly charge a portable apparatus mounted on an operating apparatus, and control a multimedia apparatus equipped in a vehicle through a portable apparatus.

In accordance with an aspect of the invention, an apparatus for operating a multimedia apparatus performing a wireless charging in a portable apparatus includes: a communicator configured to perform a communication with a multimedia apparatus; a touch pad configured to generate an input signal according to an input generated from an external; and a controller configured to verify an input position generated in the touch pad so that a point is displayed on a position of the multimedia apparatus that is identical to the position where the input is generated, and provide the verified input position to the multimedia apparatus. The controller synchronizes a screen pixel of the multimedia apparatus with a pixel of the touch pad. The apparatus further includes: a sensor unit that detects a portable apparatus contacted to the touch pad. The apparatus further includes: a charging unit that wirelessly charges a portable apparatus contacted to the touch pad. The communicator performs a communication with the portable apparatus contacted to the touch pad. The apparatus further includes: a trigger that generates a mounting verification signal when a mounting of the portable apparatus is verified. The controller provides a screen operating activation request signal of the portable apparatus to the portable apparatus in accordance with the mounting verification signal. The controller provides a pixel synchronizing request signal to the portable apparatus to synchronize a screen pixel of the portable apparatus with a screen pixel of the multimedia apparatus. The controller verifies the position where the input is generated in the screen of the portable apparatus, and provides the position to the multimedia apparatus. The controller verifies the position where the input is generated in the portable apparatus so that a point is displayed on the position of the multimedia apparatus that is identical to the position where the input has generated in the portable apparatus, and provides the verified position to the multimedia apparatus.

In accordance with another aspect of the invention, a method for operating a multimedia apparatus performing a wireless charging of a portable apparatus includes: detecting an input generated from an external by a controller; verifying a position where the input is generated; and providing the position to the multimedia apparatus so that a point is displayed on the position of the multimedia apparatus that is identical to the position where the input is generated. Before the detecting of the input, the method further includes: verifying whether the portable apparatus is contacted to the touch pad equipped in the operating apparatus. After verifying the contacting of the portable apparatus, the method further includes: charging the portable apparatus wirelessly when the portable apparatus is contacted to the touch pad. The detecting of the input includes detecting an input generated in the touch pad or the portable apparatus. After verifying whether the portable apparatus is contacted, the method further includes: synchronizing a screen pixel in the multimedia apparatus to a pixel in the touch pad when the portable apparatus is not contacted; and transmitting a pixel synchronizing request signal to synchronize a screen pixel in the portable apparatus with the screen pixel in the multimedia apparatus to the portable apparatus when the portable apparatus is contacted.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
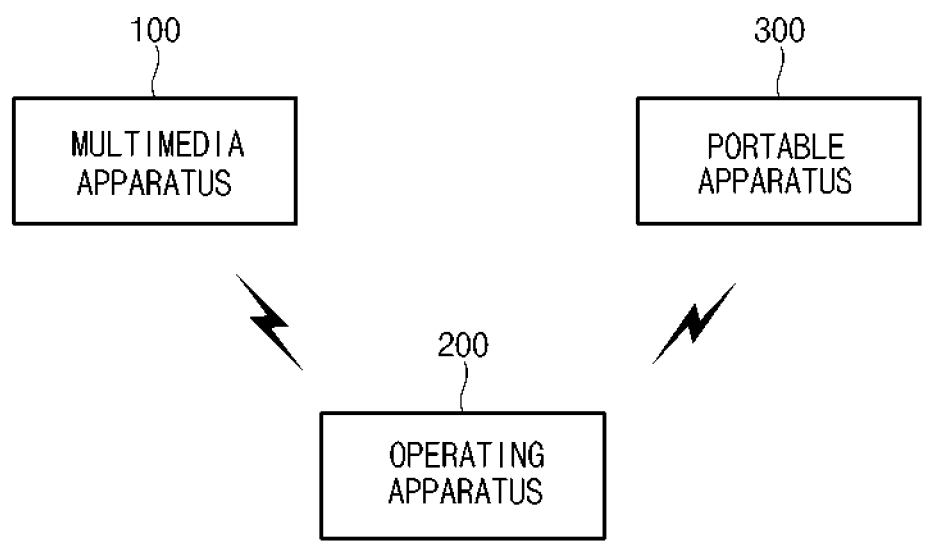
FIG. 1 is a configuration diagram illustrating a controlling system of a multimedia apparatus performing a wireless charging of a portable apparatus according to an exemplary embodiment of the present invention.
Figure 2:
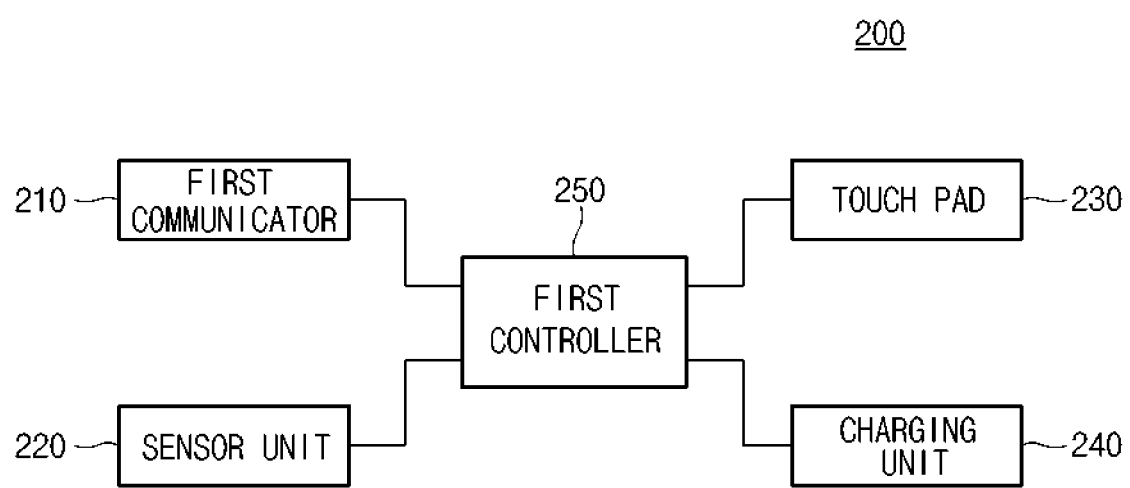
FIG. 2 is a block diagram illustrating a main configuration of an operating apparatus illustrated in FIG. 1.

FIG. 1 is a configuration diagram illustrating a controlling system of a multimedia apparatus performing a wireless charging of a portable apparatus according to an exemplary embodiment of the present invention. FIG. 2 is a block diagram illustrating a main configuration of an operating apparatus illustrated in FIG. 1.

Referring to FIGS. 1 and 2, an operating system 10 according to an exemplary embodiment of the present invention may include a multimedia apparatus 100, an operating apparatus 200 and a portable apparatus 300.

The multimedia apparatus 100 may be an Audio, Video, Navigation (AVN) apparatus equipped inside the vehicle.

The operating apparatus 200 may operate the multimedia apparatus 100 through a communication with the multimedia apparatus 100, and may charge the portable apparatus 300 wirelessly. To this end, the operating apparatus 200 may include a first communicator 210, a sensor unit 220, a touch pad 230, a charging unit 240, and a first controller 250.

The first communicator 210 may perform a wireless communication with the multimedia apparatus 100 and the portable apparatus 300. To this end, the first communicator 210 may perform a short distance wireless communication including a Bluetooth communication. In addition, when the multimedia apparatus 100 and the operating apparatus 200 are connected by wired, the first communicator 210 may perform the wired communication with the multimedia apparatus 100.

The sensor unit 220 may include a sensor that may verify whether a touch is generated in the touch pad 230, and verify whether the portable apparatus 300 is contacted to the touch pad 230.

The touch pad 230 may be formed in an upper part of the operating apparatus 200. The touch pad 230 may generate an input signal according to an input generated from an external, and may provide the generated input signal to the first controller 250. The touch pad 230 may be synchronized with a pixel of an output unit (not shown) equipped in the multimedia apparatus 100 under the control of the first controller 250.

The charging unit 240 may charge the portable apparatus 300 wirelessly by using any one method of a magnetic flowing method or a resonance method.

The first controller 250 may verify an input position generated in the touch pad 230 or the portable apparatus 300 so that a position identical to the position where an input has generated in the touch pad 230 or the portable apparatus 300 contacted to the touch pad 230 is displayed on the output unit of the multimedia apparatus 100, and provide the verified input position to the multimedia apparatus 100. The first controller 250 may charge the portable apparatus 300 wirelessly when the portable apparatus 300 is contacted to the touch pad 230.

More particularly, the first controller 250 may verify whether a contact of the portable apparatus 300 is detected in the touch pad 230 from sensing information of the sensor unit 220. When the contact of the portable apparatus 300 is not detected in the touch pad 230, the first controller 250 may adjust the pixel of touch pad 230, and synchronizes with a pixel of the output unit in the multimedia apparatus 100.

On the contrary, when the portable apparatus 300 is contacted to the touch pad 230, the first controller 250 may charge the portable apparatus 300 wirelessly by activating the charging unit 240. In addition, the first controller 250 may transmit a pixel synchronizing request signal to the portable apparatus 300 to synchronize the pixel in the output unit of the multimedia apparatus 100 and the output unit (not shown) equipped in the portable apparatus 300. Here, the output unit equipped in the portable apparatus 300 may be formed as a touch screen.

The first controller 250 may verify whether the input has generated in the output unit equipped in the touch pad 230 or the portable apparatus 300. When the input is generated in the output unit equipped in the touch pad 230 or the portable apparatus 300, the first controller 250 may verify the position where the input has generated in the output unit equipped in the touch pad 230 or the portable apparatus 300. At this time, the first controller 250 may verify a coordinate value corresponding to the position where the input has generated in the touch pad 230, or may receive and verify the coordinate value corresponding to the position where the input has generated from the portable apparatus 300.

The first controller 250 may transmit the verified coordinate value to the multimedia apparatus 100 to display a point such as an arrow, a cross, or the like on the position corresponding to the coordinate value in the output unit of the multimedia apparatus 100.

The portable apparatus 300 may be charged wirelessly by the operating apparatus 200 when being located in the touch pad 230 surface of the operating apparatus 200. The portable apparatus 300 may be a smart phone equipped with the touch screen.

Figure 3:
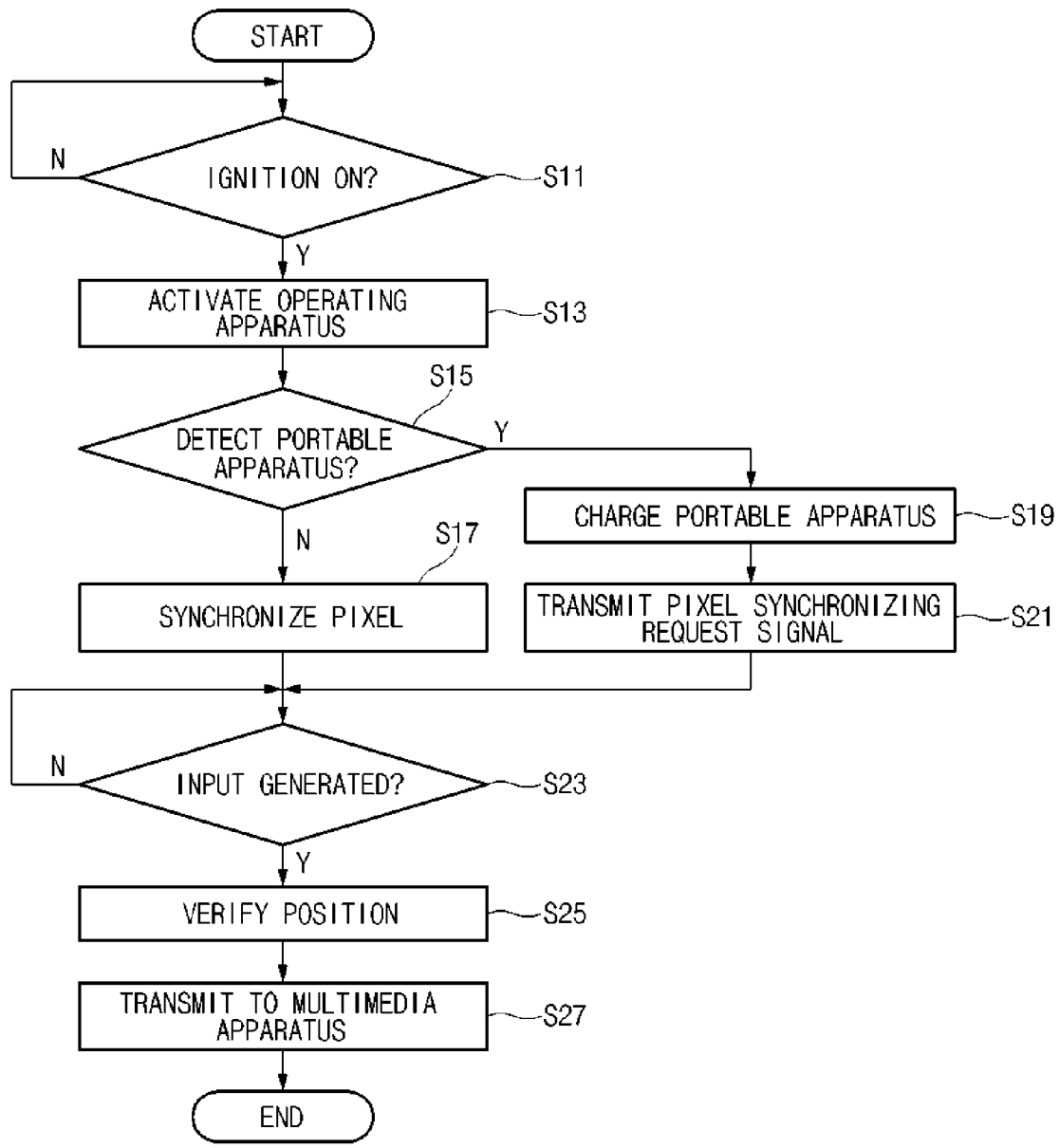
FIG. 3 is a flow chart explaining a method for controlling a multimedia apparatus in an operating apparatus according to an exemplary embodiment of the present invention.

FIG. 3 is a flow chart explaining a method for controlling a multimedia apparatus in an operating apparatus according to an exemplary embodiment of the present invention.

Referring to FIG. 3, the first controller 250 may verify whether the vehicle's ignition is turned on at step 11. Once it is verified that the vehicle's ignition is turned on at step 11, the first controller 250 may proceed to step 13.

The first controller 250 may activate the operating apparatus 200 at step 13, and proceed to step 15. The first controller 250 may verify whether a contact of the portable apparatus 300 is detected in the touch pad 230 at step 15. Following to the verification result at step 15, the first controller 250 may proceed to step 19 when the portable apparatus 300 is contacted to the operating apparatus 200. The first controller 250 may charge the portable apparatus 300 wirelessly by controlling the charging unit 240 at step 19. Next, by proceeding to step 21, the first controller 250 may request a pixel synchronizing request signal to the portable apparatus 300 to synchronize the pixel of the output unit (not shown) in the multimedia apparatus 100 and the output unit (not shown) equipped in the portable apparatus. Here, the output unit equipped in the portable apparatus 300 may be formed as the touch screen. The first controller 250 that transmitted the pixel synchronizing request signal may proceed to step 23. To this end, the operating apparatus 200 may perform a wireless communication with the portable apparatus 300.

On the contrary, when the contact of the portable apparatus 300 is not detected at step 15, the first controller 250 may proceed to step 17. At step 17, the first controller 250 may synchronize the pixel of the output unit in the multimedia apparatus 100 by adjusting the pixel in the touch pad 230. After adjusting the pixel in the touch pad 230, the first controller 250 may proceed to step 23.

Next, the first controller 150 may verify whether the input is generated in the output unit equipped in the touch pad 230 or the portable apparatus 300 at step 23. Following to the verification result at step 23, the controller 250 may proceed to step 25 when the input has generated in the output unit equipped in the touch pad 230 or the portable apparatus 300.

At step 25, the controller 250 may verify the position where the input has generated in the output unit equipped in the touch pad 230 or the portable apparatus 300. Here, the first controller 250 may verify the coordinate value corresponding to the position where the input has generated in the touch pad 200, or may receive and verify the coordinate value corresponding to the position where the input has generated from the portable apparatus 300.

At step 27, the first controller 250 may transmit the verified coordinate value to the multimedia apparatus 100. The multimedia apparatus 100 may display the point such as an arrow, a cross, or the like on the position corresponding to the coordinate value in the output unit.

Figure 4:
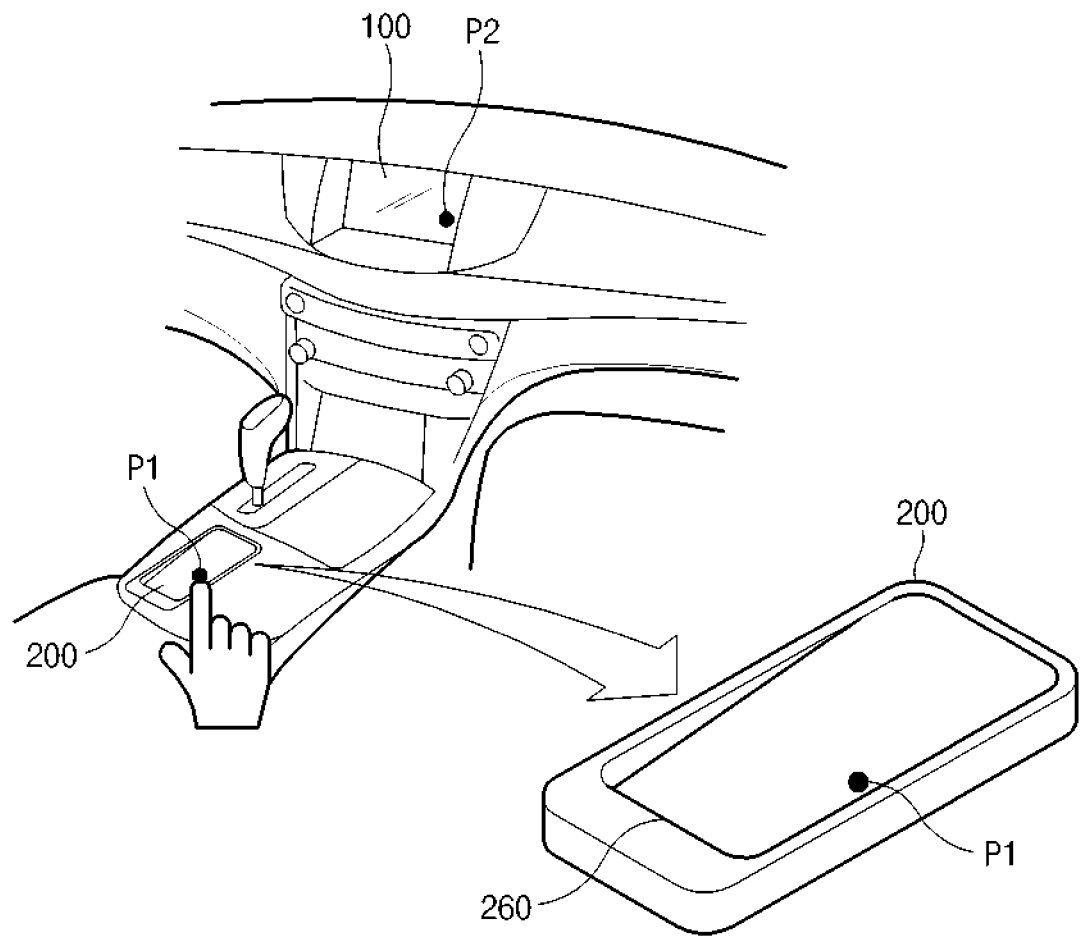
FIG. 4 is a diagram explaining a method for operating a multimedia apparatus in an operating apparatus according to an exemplary embodiment of the present invention.
Figure 5:
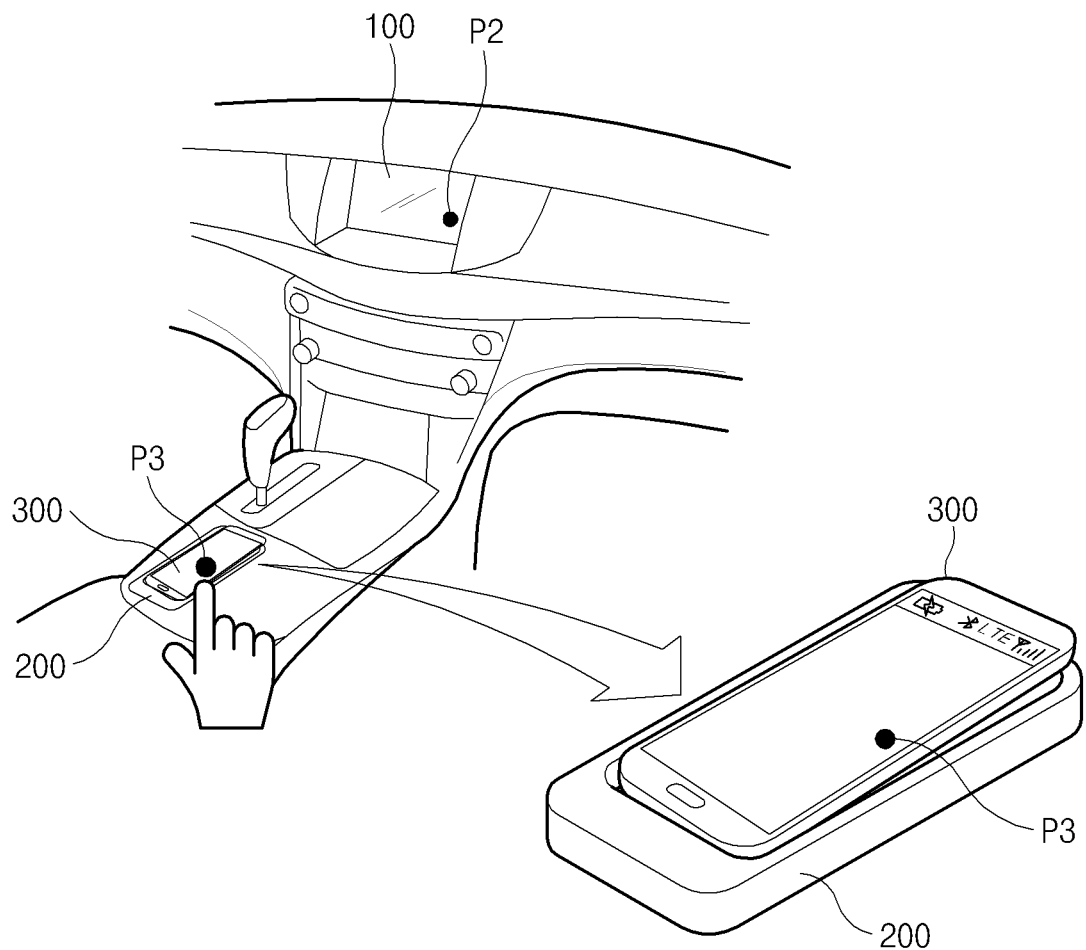
FIG. 5 is a diagram explaining a method for operating a multimedia apparatus in a portable apparatus through an operating apparatus according to an exemplary embodiment of the present invention.

FIG. 4 is a diagram explaining a method for operating a multimedia apparatus in an operating apparatus according to an exemplary embodiment of the present invention. FIG. 5 is a diagram explaining a method for operating a multimedia apparatus in a portable apparatus through an operating apparatus according to an exemplary embodiment of the present invention.

Referring to FIGS. 1, 2, 4 and 5, the multimedia apparatus 100 is equipped in the vehicle, and the operating apparatus 200 is equipped in the vehicle, and in particular, in a position where the driver can easily reach. As in FIG. 4, when the driver touches a specific point (P1) in the operating apparatus 200, the operating apparatus 200 may verify the coordinate value of the point where a touch has generated, and may transmit the coordinate value to the multimedia apparatus 100. The multimedia apparatus 100 may display a point as in P2 on the position that is corresponding to the received coordinate value. To this end, the pixel synchronization in the output unit of the touch pad 230 and the multimedia apparatus 100 has to be previously executed. Likewise, by touching the touch pad 230 in the operating apparatus 200, the driver may operate the multimedia apparatus 100 without operating the multimedia apparatus 100 directly. Besides, a trigger 260 may be formed in a lower part of the operating apparatus 200.

As in FIG. 5, when the portable apparatus 300 is mounted on an upper part of the operating apparatus 200, the first controller 250 may verify that a change is generated in the trigger 260. When the change has generated in the trigger 260, the first controller 250 may inactivate the touch pad 230, and activate the charging unit 240. Here, the trigger 260 may be formed as an uneven shape in the lower part of the operating apparatus 200, and may be formed as a shape that can fix the portable apparatus 300 mounted on the operating apparatus 200. By controlling the activated charging unit 240, the first controller 250 may charge the portable apparatus 300 mounted on the operating apparatus 200 wirelessly. When the change has generated in the trigger 260, the first controller 250 may generate the mounting verification signal verifying the mounting of the portable apparatus 300, and may transmit a screen operating activation request signal of the portable apparatus 300 to the portable apparatus 300. By performing the wireless communication with the portable apparatus 300, the first controller 250 may transmit the pixel synchronizing request signal to synchronize the pixel of the output unit of the multimedia apparatus 100 and the output unit of the portable apparatus 300 to the portable apparatus 300. In addition, when the touch such as a P3 is generated in the output unit of the portable apparatus 300, the first controller 250 may display the point such as P2 on the position identical to the P3 position in the output unit of the multimedia apparatus 100, and the multimedia apparatus 100 may perform a corresponding function when a specific function exists in the P3. In addition, when a multi touch is generated in the portable apparatus 300, the first controller 250 may display the point on the position that is identical to the position where the touch has generated in the portable apparatus 300 in the output unit of the multimedia apparatus 100 Likewise, by touching the output unit of the portable apparatus 300 while charging the portable apparatus 300 wirelessly, the driver is able to operate the multimedia apparatus 100.

Figure 6:
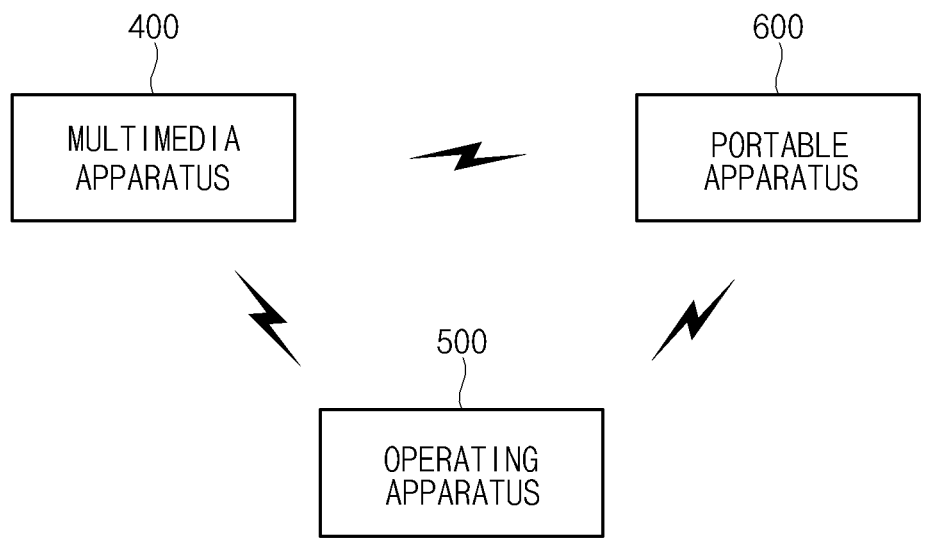
FIG. 6 is a configuration diagram illustrating a controlling system of a multimedia apparatus performing a wireless charging of a portable apparatus according to another exemplary embodiment of the present invention.
Figure 7:
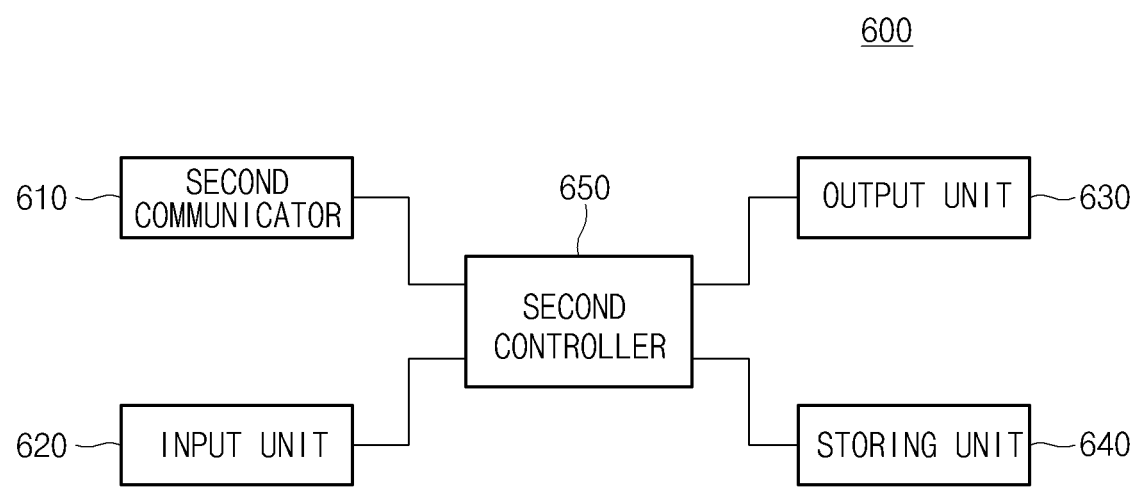
FIG. 7 is a block diagram illustrating a main configuration of an operating apparatus illustrated in FIG. 6.

FIG. 6 is a configuration diagram illustrating a controlling system of a multimedia apparatus performing a wireless charging of a portable apparatus according to another exemplary embodiment of the present invention. FIG. 7 is a block diagram illustrating a main configuration of an operating apparatus illustrated in FIG. 6.

Referring to FIGS. 6 and 7, the operating system according to another exemplary embodiment of the present invention may include a multimedia apparatus 400, an operating apparatus 500, and a portable apparatus 600.

The multimedia apparatus 400 may be an Audio, Video, Navigation (AVN) apparatus equipped inside the vehicle.

The operating apparatus 500 may operate the multimedia apparatus 400 through a communication with the multimedia apparatus 400, and may charge the portable apparatus 600 wirelessly.

When the portable apparatus 600 is located on the touch pad surface of the operating apparatus 500, it may be charged wirelessly by the operating apparatus 500. To this end, the portable apparatus 600 may include a second communicator 610, an input unit 620, an output unit 630, a storing unit 640, and a second controller 650. The portable apparatus 600 may be a smart phone.

The second communicator 610 may perform a communication with the multimedia apparatus 400. The second communicator 610 may perform a short distance wireless communication such as a Bluetooth communication.

The input unit 620 may generate an input signal to control the portable apparatus 600 by an external input, and may provide the input signal to the second controller 650. To this end, the input unit 620 may be formed as a keypad, a touch pad, and a touch screen, etc., and when the input unit 620 is formed as the touch screen, the input unit 620 may serve as the output unit 630 simultaneously.

The output unit 630 may output a message notifying that the portable apparatus mounted on the operating apparatus 500 is in wirelessly charging under the control of the second controller 650, and may display a point such as an arrow, a cross, or the like on the position where the input by the driver has generated.

The storing unit 640 may store a program for various operations performed in the portable apparatus 600, and may store a PIN CODE for a short distance wireless communication connection to the multimedia apparatus 400.

The second controller 650 may verify whether the portable apparatus 600 is contacted to the operating apparatus 500, and when the portable apparatus 600 is contacted to the operating apparatus 500, the second controller 650 may perform a charging wirelessly through the operating apparatus 500. When the short distance wireless communication with the multimedia apparatus 400 is performed, the second controller 650 may receive pixel information of the output unit equipped in the multimedia apparatus 400 through the short distance wireless communication with the multimedia apparatus 400. The second controller 650 may synchronize the pixel of the output unit 630 equipped in the portable apparatus 600 with the pixel of the output unit equipped in the multimedia apparatus 400.

When an input is generated in the output unit 630 formed as a touch screen, the second controller 650 may display a point such as an arrow, a cross, or the like on the position where the input has generated, and may verify a coordinate value of the position where the input has generated. The second controller 650 may transmit the verified coordinate value to the multimedia apparatus 400. The multimedia apparatus 400 may display a point such as an arrow, a cross, or the like on the position corresponding to the coordinate value in the output unit. In addition, when a multi input is generated in the output unit 630, the second controller 650 may verify the coordinate value of the position corresponding to a plurality of inputs, and transmit to the multimedia apparatus 400. The multimedia apparatus 400 may display the point on the position corresponding to the plurality of coordinate values in the output unit.

When a specific signal is input from the input unit 620 or the output unit 630, the second controller 650 may activate a function of the portable apparatus 600. Prior to the input of the specific signal, the portable apparatus 600 may perform only the control of the multimedia apparatus 400, a voice recognition function and a phone call function equipped in the portable apparatus 600, however, when the specific signal is input, then, the portable apparatus 600 may perform all functions in the portable apparatus normally. In addition, the specific signal may be input through the multimedia apparatus 400 as well as the portable apparatus 600.

Figure 8:
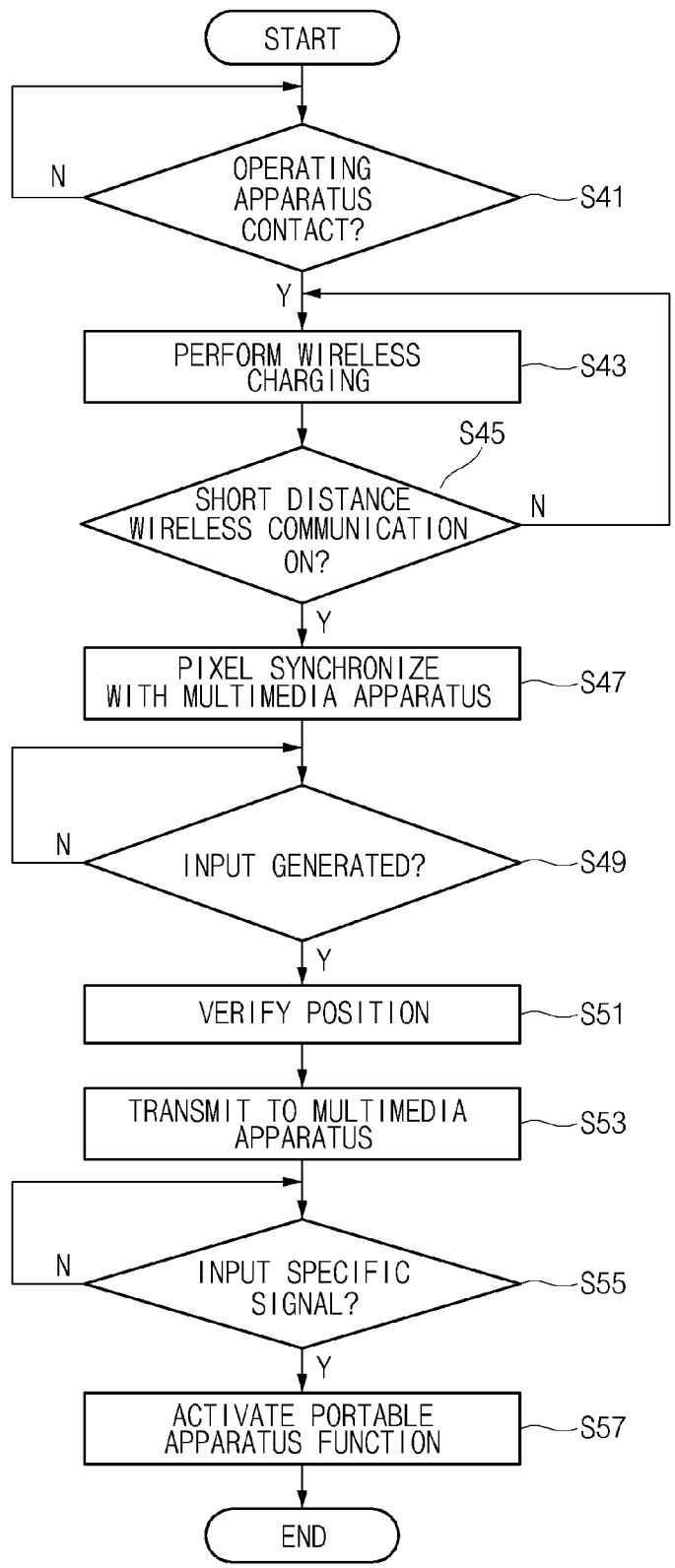
FIG. 8 is a flow chart explaining a method for controlling a multimedia apparatus in a portable apparatus according to another exemplary embodiment of the present invention.

FIG. 8 is a flow chart explaining a method for controlling a multimedia apparatus in a portable apparatus according to another exemplary embodiment of the present invention.

Referring to FIG. 8, the second controller 650 may verify whether the portable apparatus is contacted to the operating apparatus 500 at step 41. Following to the verification result of step 41, when the portable apparatus 600 is contacted to the operating apparatus 500, the second controller 650 may perform the charging wirelessly through the operating apparatus 500 at step 43.

Next, at step 45, the second controller 650 may verify whether the short distance communication is activated and a communication with the multimedia apparatus 400 is performed. When the short distance communication is in an activated state, the second controller 650 may proceed to step 47, whereas the second controller may return to step 43 and perform the wireless charging continuously when the short distance communication is not activated.

At step 47, the second controller 650 may synchronize the pixel of the output unit 630 equipped in the portable apparatus 600 by receiving pixel information of the output unit equipped in the multimedia apparatus 400 through the communication with the multimedia apparatus 400. At step 49, the second controller 650 may verify whether the input is generated in the output unit 630 formed as the touch screen. Following to the verification result at step 49, the second controller 650 may proceed to step 51, when the input is generated in the output unit 630.

At step 51, the second controller 650 may verify the coordinate value of the position where the input has generated, and may proceed to step 53. At step 53, the second controller 650 may transmit the verified coordinate value to the multimedia apparatus 400. The multimedia apparatus 400 may display the point such as an arrow, a cross, or the like on the position corresponding to the coordinate value in the output unit.

Next, at step 55, the second controller 650 may verify whether the specific signal is input from the input unit 620. Following to the verification result at step 55, when the specific signal is input, the second controller 650 may activate the function of the portable apparatus 600 by proceeding to step 57. Prior to the input of the specific signal, the portable apparatus 600 may perform only a controlling of the multimedia apparatus 400, a voice recognition function and a phone call function equipped in the portable apparatus 600, however, once the specific signal is input, the portable apparatus 600 may perform all functions in the portable apparatus 600 normally.

Figure 9:
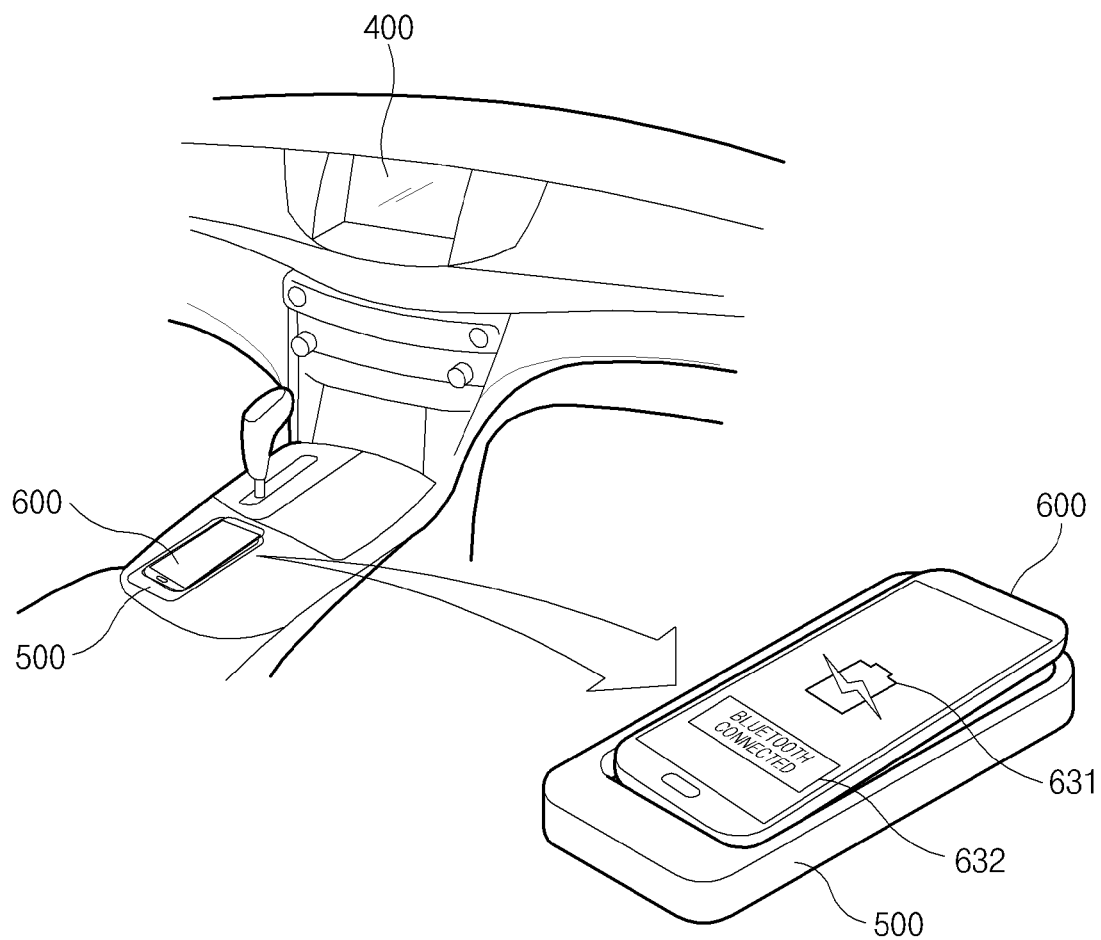
FIGS. 9 and 10 are diagrams explaining a method for operating a multimedia apparatus in a portable apparatus according to another exemplary embodiment of the present invention.
Figure 10:
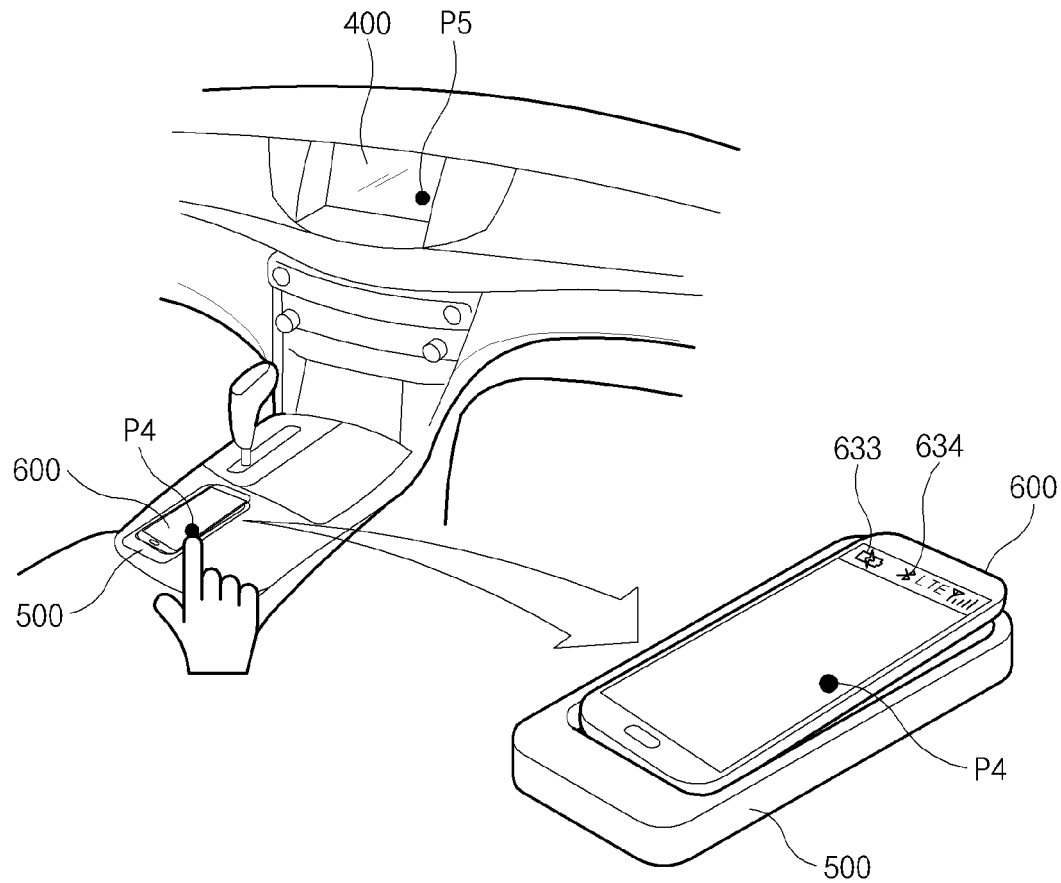

FIGS. 9 and 10 are diagrams explaining a method for operating a multimedia apparatus in a portable apparatus according to another exemplary embodiment of the present invention.

Referring to FIGS. 6, 7, 9 and 10, the multimedia apparatus 400 and the operating apparatus 500 are equipped inside the vehicle, and the portable apparatus 600 may be mounted on an upper part of the operating apparatus 500. In the portable apparatus 600 mounted on the upper part of the operating apparatus 500 as shown in FIG. 9, an image (reference numeral 631) notifying that the portable apparatus 600 is in wireless charging, and a button (reference numeral 632) to communicate wirelessly with the multimedia apparatus 400 are displayed on the output unit 630. When the driver selects a button corresponding to reference numeral 632, the output unit 630 in the portable apparatus 600 may be converted into a screen as in FIG. 10.

As shown in FIG. 10, in the portable apparatus 600 connected to the multimedia apparatus 400 with a short distance wireless communication, an icon notifying that it is in wireless charging as in reference numeral 633 is displayed, and an icon notifying that a short distance wireless communication is activated as in reference numeral 634 is displayed in the upper part of the output unit 630. In addition, when the driver touches the specific point (P4) of the portable apparatus 600 mounted on the operating apparatus 500, the portable apparatus 600 may verify the coordinate value of the point where the touch has generated, and transmit to the multimedia apparatus 400. The multimedia apparatus 400 may display the point such as P5 in the position that is corresponding to the received coordinate value, and, when a function corresponding to P5 exists, the multimedia apparatus 400 may perform the function. Likewise, without operating the multimedia apparatus 400 directly, the driver may operate the multimedia apparatus 400 through the output unit 400 of the portable apparatus 600.

As described above, the present invention may easily control the multimedia apparatus by controlling the multimedia apparatus equipped in a vehicle that is formed in a position where a driver may easily operate.

In addition, the present invention may charge the portable apparatus wirelessly by mounting the portable apparatus on the operating apparatus that may control the multimedia apparatus.

Further, the present invention may charge the portable apparatus mounted on the operating apparatus wirelessly, and may easily control the multimedia apparatus by controlling the multimedia apparatus equipped in the vehicle through the portable apparatus.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. An operating apparatus for operating a multimedia apparatus and performing wireless charging of a portable apparatus, the operating apparatus comprising:
   a communicator configured to communicate with the multimedia apparatus;
   a touch pad formed in an upper part of the operating apparatus to generate an input signal according to an input generated from an external source; and
   a controller configured to verify an input position generated in the touch pad so that a point is displayed on a position of the multimedia apparatus that is identical to the position where the input is generated, and provide the verified input position to the multimedia apparatus, wherein
   the controller is further configured to detect an input received on a screen of the portable apparatus when the portable apparatus is in contact with the upper part of the operating apparatus, verify a position on the screen of the portable apparatus where the input is received, and provide the verified position on the screen of the portable apparatus to the multimedia apparatus, and the controller is further configured to synchronize a screen pixel of the multimedia apparatus with a pixel of the touch pad when the portable apparatus is not in contact with the touch pad.

2. The operating apparatus of claim 1, further comprising:
   a sensor unit that detects the portable apparatus is in contact with the touch pad.

3. The operating apparatus of claim 2, further comprising:
   a charging unit that wirelessly charges the portable apparatus in contact with the touch pad.

4. The operating apparatus of claim 3, wherein the communicator communicates with the portable apparatus in contact with the touch pad.

5. The operating apparatus of claim 4, further comprising:
   a trigger that generates a mounting verification signal when a mounting of the portable apparatus is verified.

6. The operating apparatus of claim 5, wherein the controller provides a screen operating activation request signal to the portable apparatus in accordance with the mounting verification signal.

7. The operating apparatus of claim 5, wherein the controller provides a pixel synchronizing request signal to the portable apparatus to synchronize a screen pixel of the portable apparatus with the screen pixel of the multimedia apparatus.

8. The operating apparatus of claim 6, wherein the controller verifies the position where the input is generated on the screen of the portable apparatus, and provides the position to the multimedia apparatus.

9. The operating apparatus of claim 8, wherein the controller verifies the position where the input is generated on the screen of the portable apparatus so that a point is displayed on the position of the multimedia apparatus that is identical to the position where the input has generated on the screen of the portable apparatus, and provides the verified position to the multimedia apparatus.

10. A method for operating a multimedia apparatus and performing wireless charging of a portable apparatus using an operating apparatus, the method comprising:
    detecting, by a controller, an input received on a screen of the portable apparatus when the portable apparatus is in contact with an upper part of the operating apparatus;
    verifying a position on the screen of the portable apparatus where the input is generated;
    providing the verified position on the screen of the portable apparatus to the multimedia apparatus so that a point is displayed on the multimedia apparatus that is identical to the position on the screen of the portable apparatus where the input is generated; and
    synchronizing a screen pixel of the multimedia apparatus with a pixel of a touch pad formed in the upper part of the operating apparatus when the portable apparatus is not in contact with the touch pad.

11. The method of claim 10, before the detecting of the input, further comprising:
    verifying whether the portable apparatus is in contact with the touch pad.

12. The method of claim 11, after verifying the contacting of the portable apparatus, further comprising:
    charging the portable apparatus wirelessly when the portable apparatus is in contact with the touch pad.

13. The method of claim 12, wherein the detecting of the input comprises detecting an input generated in the touch pad or the portable apparatus.

14. The method of claim 13, after verifying whether the portable apparatus is contacted, further comprising:

transmitting a pixel synchronizing request signal to synchronize a screen pixel of the portable apparatus with the screen pixel of the multimedia apparatus to the portable apparatus when the portable apparatus is contacted.

* * * * *